US008775465B2

(12) United States Patent  
Peyrichoux et al.

(10) Patent No.: US 8,775,465 B2  
(45) Date of Patent: Jul. 8, 2014

(54) AUTOMATIC UPDATING OF CONTENT INCLUDED IN RESEARCH DOCUMENTS

(75) Inventors: Isabelle Peyrichoux, San Francisco, CA (US); Ashley Hall, Menlo Park, CA (US); Liang-Yu Chi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1054 days.

(21) Appl. No.: 12/182,750

(22) Filed: Jul. 30, 2008

(65) Prior Publication Data

US 2010/0030813 A1    Feb. 4, 2010

(51) Int. Cl.
*G06F 17/30* (2006.01)
*G06F 7/00* (2006.01)

(52) U.S. Cl.
USPC ............................................. 707/770

(58) Field of Classification Search
USPC ............................................. 707/803
See application file for complete search history.

(56) References Cited

U.S. PATENT DOCUMENTS

| | | | |
|---|---|---|---|
| 5,701,461 A * | 12/1997 | Dalal et al. ............................ | 1/1 |
| 7,454,410 B2 | 11/2008 | Squillante et al. | |
| 7,519,902 B1 * | 4/2009 | Kraft et al. ..................... | 715/234 |
| 2004/0225642 A1 | 11/2004 | Squillante et al. | |
| 2005/0071766 A1 | 3/2005 | Brill et al. | |
| 2006/0190561 A1 | 8/2006 | Conboy et al. | |
| 2006/0294469 A1 | 12/2006 | Sareen et al. | |
| 2007/0016514 A1 * | 1/2007 | Al-Abdulqader et al. ...... | 705/37 |
| 2007/0038688 A1 | 2/2007 | Morrill et al. | |
| 2008/0147677 A1 * | 6/2008 | Nishino et al. .................. | 707/10 |
| 2008/0195973 A1 * | 8/2008 | Shimkin ........................ | 715/817 |
| 2009/0249178 A1 * | 10/2009 | Ambrosino et al. .......... | 715/205 |
| 2009/0288099 A1 | 11/2009 | Rybak et al. | |
| 2010/0131534 A1 * | 5/2010 | Takeda et al. ................. | 707/758 |
| 2010/0145927 A1 * | 6/2010 | Kasbekar et al. ............. | 707/710 |

FOREIGN PATENT DOCUMENTS

| | | |
|---|---|---|
| JP | 2005032270 | 2/2005 |
| KR | 1020060061425 | 6/2006 |
| WO | 2010014400 A2 | 2/2010 |
| WO | 2010014400 A3 | 4/2010 |

OTHER PUBLICATIONS

U.S. Appl. No. 12/181,796, filed Jul. 29, 2008, 63 pages.
International Search Report and Written Opinion for International Appl. No. PCT/US2009/050713 dated Feb. 8, 2010, 10 pages.

* cited by examiner

*Primary Examiner* — Kuen Lu
(74) *Attorney, Agent, or Firm* — Pillsbury Winthrop Shaw Pittman LLP

(57) ABSTRACT

Systems and methods for updating a document are provided. A document content updater is configured to determine a web-based source for a section of content that is contained in an electronic document. The document content updater is further configured to determine for the section of content an update that is included in a copy of the web-based source contained in web-content downloaded by a web crawler. The document content updater is further configured to provide the determined update to be included in the electronic document.

22 Claims, 14 Drawing Sheets

2000

2002
determine a web-based source for a section of content that is contained in an electronic document 2004
determine for the section of content an update that is included in a copy of the web-based source contained in web-content downloaded by a web crawler 2006
provide the determined update to be indicated in the electronic document

FIG. 20

AUTOMATIC UPDATING OF CONTENT INCLUDED IN RESEARCH DOCUMENTS

BACKGROUND OF THE INVENTION

1. Field of the Invention

The present invention relates to the updating of content in electronic documents.

2. Background

An increase in available content on the World Wide Web and innovations in Internet search technology have changed the way people access information. By searching the Web, a user can now perform a wide variety of research-based tasks such as planning a vacation, purchasing a car, or performing academic research. While finding sought-after information on the Web has generally become easier, collecting and organizing Web research and later coming back to it remains challenging. This is due, in part, to the fact that Web-based research sessions may last a long time, span multiple sessions, involve gathering large amounts of content, and change in focus over time as new topics of research emerge.

While performing research on the Web, users often need to painstakingly record the URLs (Uniform Resource Locators) associated with Web pages that they visit, the search terms that work best for them, and information from the destination pages they reach. Users may record such data in written form (e.g., by writing such data in a journal or on Post-it® notes) or in electronic form (e.g., by cutting and pasting such data into a word processing document), thereby creating impromptu research documents that may subsequently be used to explore their work in a particular area. Other conventional methods for collecting and organizing such data include saving bookmarks or tabs associated with Web pages, storing Web pages locally, or using basic scratchpad programs such as Google™ Notebook.

Each of these methods and tools require a user to proactively sort through, select and record information that is suitable for inclusion in a formal or informal Web research record. This can be a time-consuming, tedious and sometimes confusing task as the user navigates between different Web pages and browser windows. Performing such a task will inevitably slow down the research process and generally make it more unpleasant. In each case, the quality of the research record generated is directly related to the amount of effort expended by the user in meticulously recording URLs, search terms and Web content. Depending upon the medium used for recording and the level of effort expended by the user, the resulting research record may be messy and disorganized, thereby compromising its future usefulness. Furthermore, Web pages are frequently updated, and thus information copied from the Web into the research record may rapidly become out of date.

Furthermore, in some cases, it may desirable to collect attribution information for the sources of information obtained when performing research on the Web. Maintaining such attribution information may be particularly important when the research is to be used for academic purposes (e.g., a homework assignment, a journal paper, etc.), for a public presentation, and/or for other similar purposes. Attribution information may be listed in a bibliography section of a research document, for instance. Maintaining proper attribution information for information obtained from the Web may be inconvenient, however, because collecting attribution information may slow down research efforts. Furthermore, proper source attribution information is not always easy to ascertain, as documents are routinely copied from website to website on the Web without maintaining information regarding the original source.

What is needed then is a means for allowing users to maintain a record of research that avoids the shortcomings of the foregoing conventional approaches.

BRIEF SUMMARY OF THE INVENTION

Systems and methods for updating a document are provided. The document may be an electronic document in which content is copied during the conduct of research on a subject, for instance. The content may be copied from any suitable source, such as from documents available on a network, including documents available in the World Wide Web. Updates may be generated for each instance of content copied into the document.

In one example implementation, a method for updating an electronic document is provided. A web-based source for a section of content that is contained in an electronic document is determined. An update is determined for the section of content. The update is determined from a copy of the web-based source contained in web-content downloaded by a web crawler. The determined update is provided to be indicated in the electronic document.

In another implementation, a document content updater is configured to determine a web-based source for a section of content that is contained in an electronic document. The document content updater is further configured to determine for the section of content an update that is included in a copy of the web-based source contained in web-content downloaded by a web crawler. The document content updater is further configured to provide the determined update to be included in the electronic document.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 20 shows a flowchart for generating updated content, according to an example embodiment of the present invention.

Figure 1:
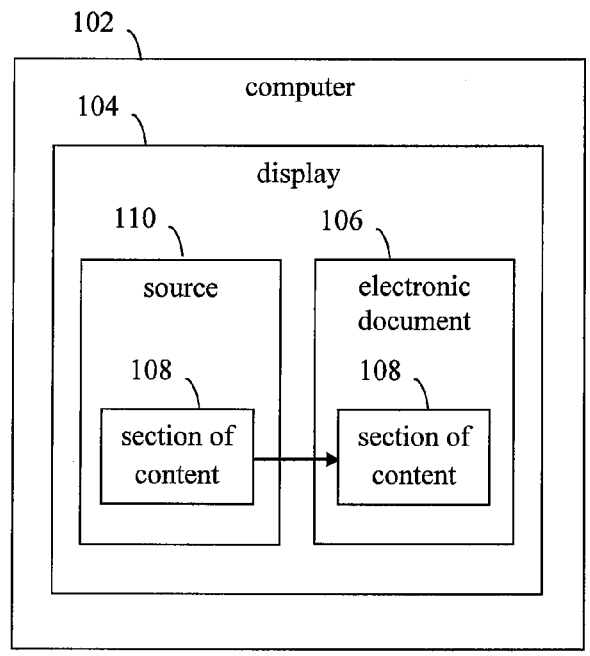
FIGS. 1 and 2 show block diagrams of computers that a user may interact with to perform research.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

While using a computer to perform research on a subject, users often copy information of interest into an electronic document that is their repository of research information. For example, FIG. 1 shows a block diagram of a computer 102 that a user may interact with to perform research. As shown in FIG. 1, computer 102 has a display 104 that displays an electronic document 106. The user may view and interact with electronic document 106 using display 104 and computer 102. For example, electronic document 106 may be open in a document editor running on computer 102 that enables document 106 to be edited, such as a word processor or a web browser. Electronic document 106 may be a document that the user may use to collect information copied from other sources for research purposes, also referred to as a "research document."

As shown in FIG. 1, during the course of research, the user may desire to copy a section of content 108 from a source 110 into electronic document 106. Source 110 may be any suitable source accessible at computer 102, including another electronic document or a web page. Section of content 108 may include any content suitable to be included in an electronic document, including text, graphics (figures, video, etc.), and/or further types of content. As shown in FIG. 1, section of content 108 is received in electronic document 106 from source 110. Although a single section of content 108 is shown in FIG. 1, electronic document 106 may receive any number of sections of content 108, depending on the type and extent of research being performed by a user at computer 102. Such sections of content 108 may be received from any number of sources 110.

Figure 2:
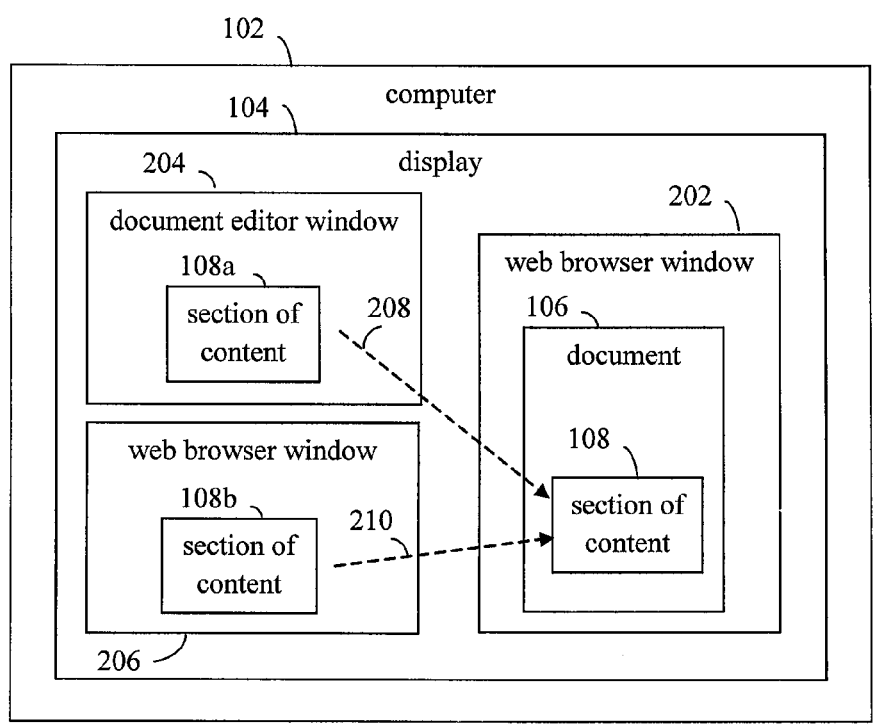

For instance, FIG. 2 shows a block diagram of computer 102, where document 106 is open in a first web browser window 202. Two examples of source 110 are shown in FIG. 2-a document editor window 204 and a second browser window 206.

As shown in FIG. 2, the user may copy a section of content 108a from document editor window 204 into document 106 using a first paste operation 208, and/or may copy a section of content 108b from second web browser window 206 into document 106 using a second paste operation 210. These copy operations may be performed in any manner, including using a drag-and-drop operation, a cut-and-paste operation, a copy-and-paste operation, etc. For the purposes of the present application, a "paste" operation includes a paste that occurs in a cut-and-paste operation and a copy-and-paste operation, and also includes the "drop" operation that occurs in a drag-and-drop operation.

Figure 3:
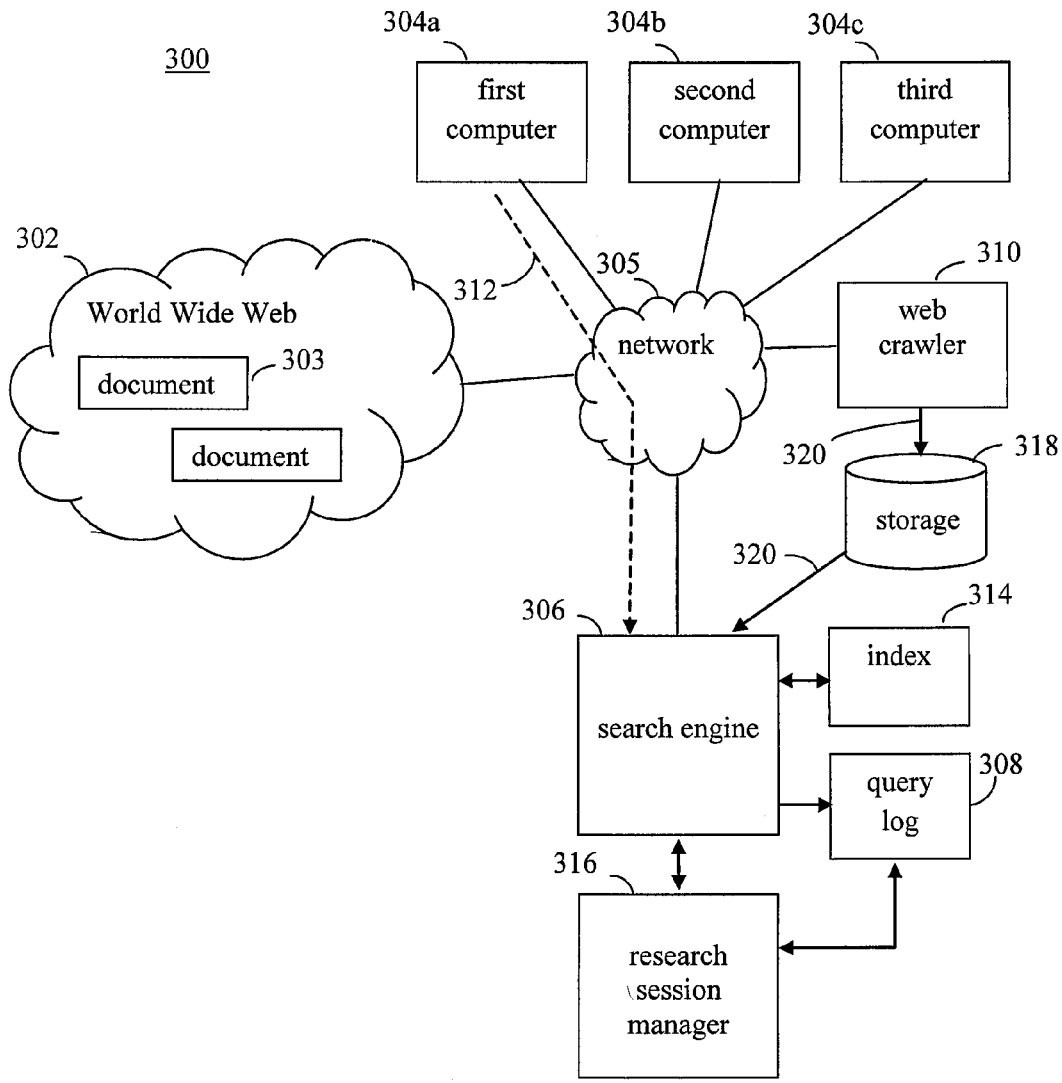
FIG. 3 is a block diagram of an information retrieval system in which an embodiment of the present invention may be implemented.

In the example of FIG. 2, a user inserts content 108 into document 106 using manual paste operations. In further examples, content 108 may be entered into document 108 in a more automated fashion, such as through the use of a research assist tool. For instance, FIG. 3 shows a block diagram of an information retrieval system 300 in which an example research assist tool is implemented. As is described in detail further below, system 300 utilizes a network search engine to generate research information that may be input into electronic document 106 in an automated fashion. System 300 is described herein for illustrative purposes only, and it is noted that embodiments of the present invention may be implemented in alternative environments.

As shown in FIG. 3, system 300 includes a search engine 306 and a web crawler 310. One or more computers 304, such as first computer 304a, second computer 304b and third computer 304c, are connected to a communication network 305. Network 305 may be any type of communication network, such as a local area network (LAN), a wide area network (WAN), or a combination of communication networks. In embodiments, network 305 may include the Internet and/or an intranet. Computers 304 can retrieve documents from entities over network 305. In embodiments where network 305 includes the Internet, a collection of documents, including a document 303, which form a portion of World Wide Web 302, are available for retrieval by computers 304 through network 305. On the Internet, documents may be identified/located by a uniform resource locator (URL), such as http://www.yahoo.com, and/or by other mechanisms. Computers 304 can access document 303 through network 305 by supplying a URL corresponding to document 303 to a document server (not shown in FIG. 3).

As shown in FIG. 3, web crawler 310 is coupled to network 305. Web crawler 310 may also be referred to as a "web spider," "spidering engine," "web robot," or by other name, as would be known to persons skilled in the relevant art(s). Web crawler 310 is configured to methodically browse World Wide Web 302 for documents to copy and download, such as document 303. Large numbers of documents may be "crawled" by web crawler 310, including millions or even billions of documents of World Wide Web 302. Web crawler 310 accesses a list of addresses (e.g., URLs (uniform resource locators)) for documents on World Wide Web 302, and visits and copies/downloads each document. Web crawler 310 identifies any further document addresses provided in the copied documents, and adds them to the list of addresses. Web crawler 310 outputs the copied documents as downloaded web content 320, which is stored in storage 318.

Search engine 306 is configured to access storage 318 to receive downloaded web content 320. Search engine 306 processes downloaded web content 320 to generate an index 314, which is configured to index the downloaded documents of World Wide Web 302. Search engine 306 generates index 314 such that rapid and accurate information retrieval with regard to the downloaded documents may be performed by referencing index 314. Index 314 may be configured in any suitable manner, as would be known to persons skilled in the relevant art(s).

Search engine 306 is coupled to network 305. A user of computer 304a who desires to retrieve one or more documents relevant to a particular topic, but does not know the identifier/location of such a document, may submit a query 312 to search engine 306 through network 305. Search engine 306 receives query 312, and analyzes index 314 to identify documents relevant to query 312. For example, search engine 306 may identify a set of documents indexed by index 314 that include terms of query 312. The set of documents may include any number of documents, including tens, hundreds, thousands, millions, or even billions of documents. Search engine 306 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents.

The list of the returned documents may be provided to a user in the context of a document termed a "search results page." As is known to persons skilled in the relevant art(s), a search results page may include user interface elements, such as hypertext links, associated with each returned document. In one implementation, responsive to the activation of such a user interface element (e.g., clicking on a hyperlink) by a user, search engine 306 will cause the returned document associated with the user interface element to be presented to the user. The presentation may involve the delivery of the document from a document server (not shown in FIG. 3) to any one of user computers 304a-304c.

Search engine 306 and web crawler 310 may each be implemented in hardware, software, firmware, or any combination thereof. For example, search engine 306 and web crawler 310 may each include software/firmware that executes in one or more processors of one or more computer systems, such as one or more servers. Examples of search engine 306 that are accessible through network 305 include, but are not limited to, Yahoo! Search™ (at http://www.yahoo.com), Ask.com™ (at http://www.ask.com), and Google™ (at http://www.google.com). Examples of web crawler 310 include, but are not limited to, Yahoo! Slurp™ and Google Googlebot™.

Figure 4:
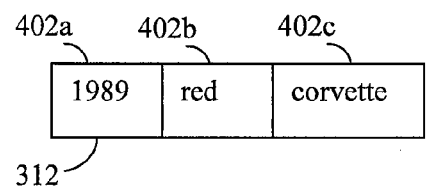
FIG. 4 shows an example query that may be submitted by a user to a search engine.

FIG. 4 shows an example query 312 that may be submitted by a user of one of computers 304a-304c of FIG. 3 to search engine 306. As shown in FIG. 4, query 312 includes one or more terms 402, such as first term 402a, second term 402b and third term 402c. Any number of terms 402 may be present in a query. As shown in FIG. 4, terms 402a, 402b and 402c of query 312 are "1989," "red," and "corvette," respectively. Search engine 306 applies these terms 402a-402c to index 314 to retrieve a document locator, such as a URL, for one or more indexed documents that match "1989," "red," and "corvette," and may order the list of documents according to a ranking.

As also shown in FIG. 3, search engine 306 may generate a query log 308. Query log 308 is a record of searches that are made using search engine 306. Query log 308 may include a list of queries, by listing query terms (e.g., terms 402 of query 312) along with further information/attributes for each query, such as a list of documents resulting from the query, a list/indication of documents in the list that were selected/clicked on ("clicked") by a user reviewing the list, a ranking of clicked documents, a timestamp indicating when the query is received by search engine 306, an IP (internet protocol) address identifying a unique device (e.g., a computer, cell phone, etc.) from which the query terms were submitted, an identifier associated with a user who submits the query terms (e.g., a user identifier in a web browser cookie), and/or further information/attributes.

As further shown in FIG. 3, system 300 also includes a research session manager 316 connected to search engine 306 and query log 308. Research session manager 316 is configured to maintain a record of research performed by users of computers 304a-304c. In particular, research session manager 316 is configured to obtain information implicitly generated through the interaction of a user with information retrieval system 300 while performing research and to use such information to automatically construct a research document, which may be electronic document 106 shown in FIG. 1, for the user about a particular research topic. The research document or a means of access thereto is then presented to the user. In an embodiment, the research document or a means of access thereto is presented to the user via a search results page generated by search engine 306 and delivered to a computer 304a-304c over network 305.

The research document generated by research session manager 316 may be configured to maintain both the implicitly-generated data recorded by research session manager 316 as well as data explicitly provided or collected by a user of any of computers 304a-304c, such as retrieved document content and user notes, in a manner that is highly-organized and easy to access, augment, and maintain. Such receiving of data, implicitly and/or explicitly, in the research document is further examples of the receiving section of content 108 in electronic document 106, as shown in FIG. 1, in a more automated fashion when compared to a user initiated "paste" operation.

Research session manager 316 may be implemented in hardware, software, firmware, or any combination thereof. For example, research session manager 316 may include software/firmware that executes in one or more processors of one or more computer systems, such as one or more servers. Examples of research session manager 316 are described in commonly-owned, co-pending U.S. patent application Ser. No. 12/181,796, filed Jul. 29, 2008, entitled "Building a Research Document Based on Implicit/Explicit Actions," the entirety of which is incorporated by reference herein (hereinafter "Research Session Builder application").

B. Example Embodiments for a Source Attribution Generator

In some cases, it may be desirable to collect attribution information for a section of content 108 that is received in electronic document 106. Maintaining such attribution information may be particularly important when research is being performed for academic purposes (e.g., a homework assignment, a journal paper, etc.), for a public presentation, and/or for other similar purposes. Maintaining proper attribution information for information obtained from the Web may be inconvenient, however, because attribution information may not be readily available, and thus collecting attribution information may slow down research efforts. Furthermore, proper source attribution information is not always easy to ascertain, as documents are routinely copied from website to website on the Web. In such cases, multiple sources for content may be available, and attribution information may be desirable to provide for some of all of the sources.

Embodiments of the present invention enable attribution information to be generated for content received in an electronic document. Such embodiments enable users to maintain a record of research and attribution that avoids the shortcomings of conventional approaches.

Figure 5:
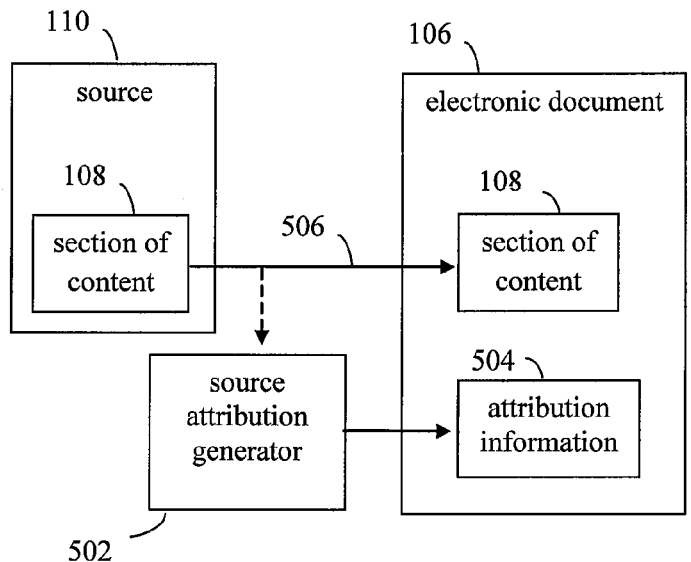
FIG. 5 shows a block diagram of a research and attribution system, according to an example embodiment of the present invention.

For instance, FIG. 5 shows a block diagram of a research and attribution system 500, according to an example embodiment of the present invention. As shown in FIG. 5, system 500 includes a source attribution generator 502. In a similar fashion as shown in FIG. 1, in FIG. 5, during the course of research, a user may desire to copy section of content 108 from source 110 into electronic document 106. Source attribution generator 502 is configured to generate attribution information 504 for one or more sources of section of content 108, such as source 110. Attribution information 504 is output from source attribution generator 502, and is received in document 106. Typically, attribution information 504 is positioned in document 106 proximate to section of content 108 in document 106 to indicate attribution, but may alternatively or additionally positioned elsewhere, such as in a bibliography section.

Generation of attribution information 504 by source attribution generator 502 may be initiated in various ways. For example, as shown in FIG. 5, a paste operation 506 is performed by a user to insert section of content 108 into electronic document 106. Source attribution generator 502 may receive an indication of paste operation 506 (as indicated by the dotted line in FIG. 5). The received indication of paste operation 506 may cause source attribution generator 502 to perform generation of attribution information 504. In another embodiment, the receipt of section of content 108 in electronic document 106 in an automated fashion, such as described above with regard to research session manager 316 in FIG. 3, may cause source attribution generator 502 to perform generation of attribution information 504. In still another embodiment, a graphical interface element may be present on a graphical interface displayed to the user that if interacted with by the user, causes source attribution generator 502 to perform generation of attribution information 504 for section of content 108 (and optionally for all further sections of content present in document 106).

Figure 6:
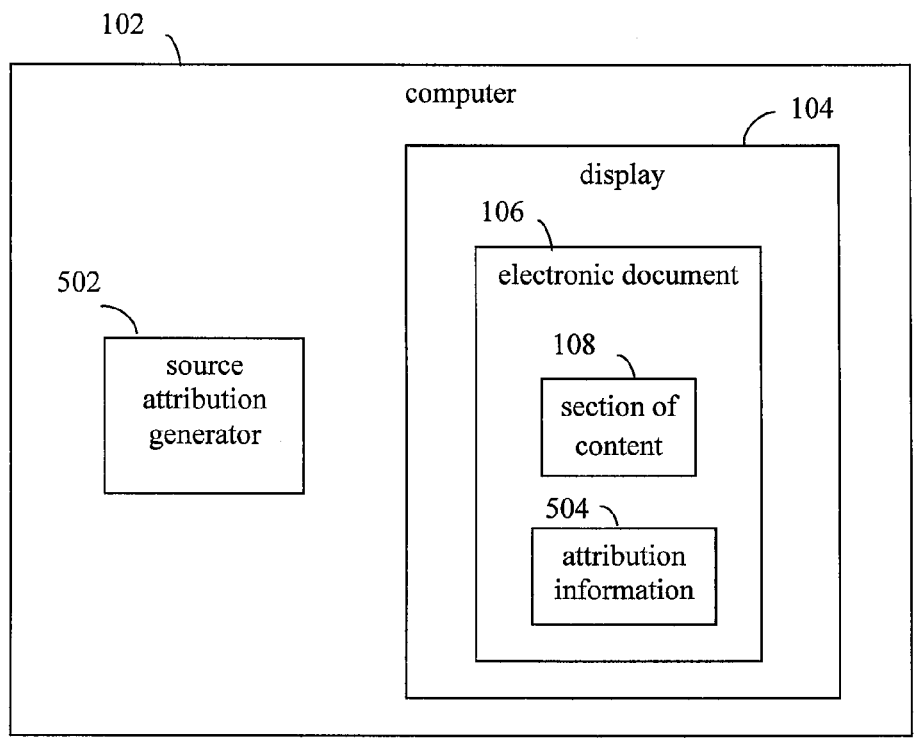
FIG. 6 shows a block diagram of a computer system in which a source attribution generator may be located, according to an example embodiment of the present invention.

Source attribution generator 502 may be implemented in hardware, software, firmware, or any combination thereof. For example, source attribution generator 502 may be implemented in hardware logic, and/or may include software/firmware that executes in one or more processors of one or more computer systems, such as one or more servers. Source attribution generator 502 may be located in any suitable location. For instance, FIG. 6 shows a block diagram of a computer system 600 in which source attribution generator 502 may be located, according to an example embodiment of the present invention. As shown in FIG. 6, computer system 600 includes computer 102. Computer 102 includes source attribution generator 502, which may be implemented as software code that runs on computer 102, for example. Computer 102 further includes display 106, which displays electronic document 106. As shown in FIG. 6, electronic document 106 displays section of content 108 and attribution information 504 generated by source attribution generator 502, which provides attribution to the source of section of content 108.

Figure 7:
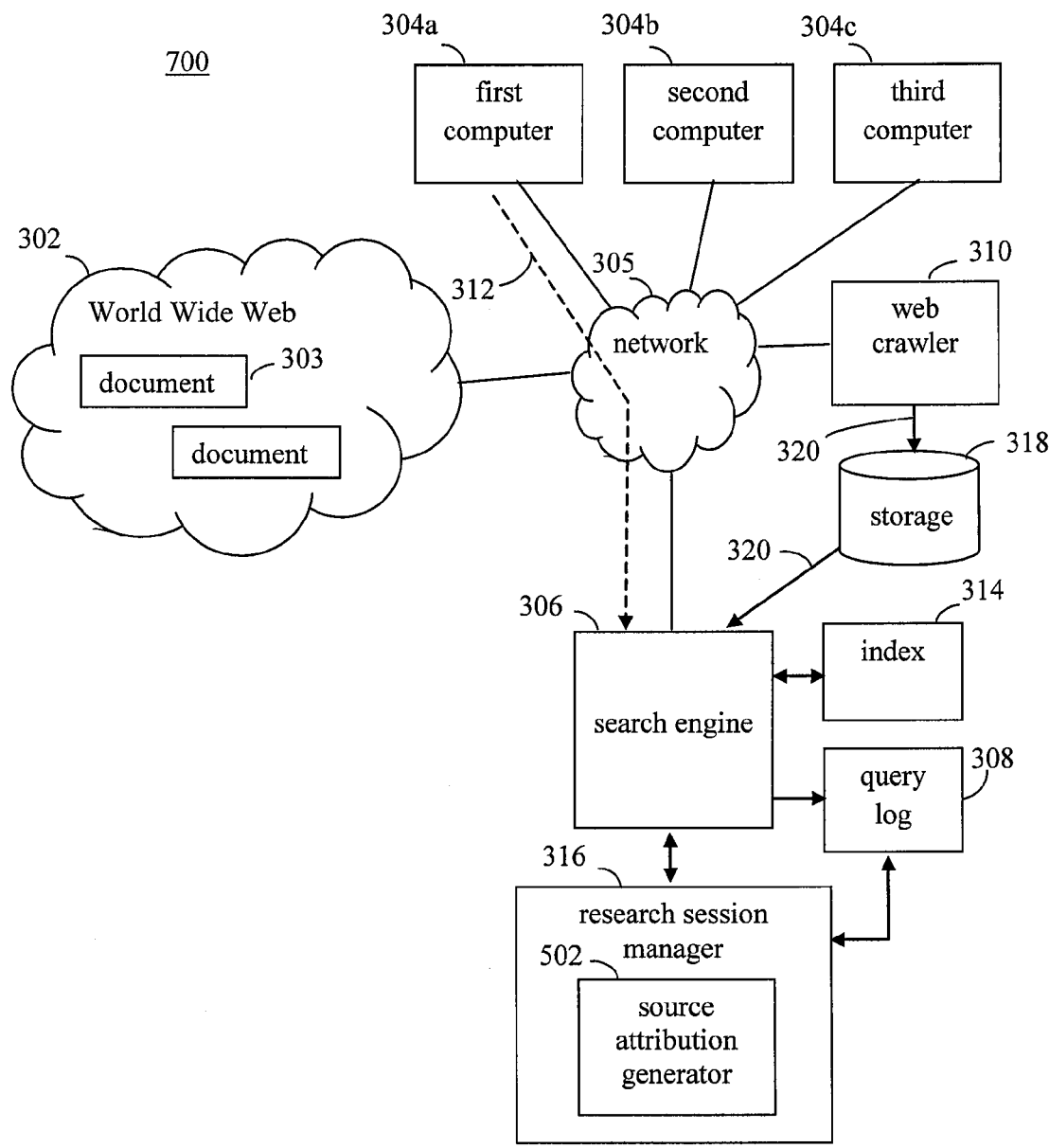
FIG. 7 shows a block diagram of an information retrieval system that includes a source attribution generator, according to an example embodiment of the present invention.

FIG. 7 shows a block diagram of an information retrieval system 700 that may include source attribution generator 502, according to another example embodiment of the present invention. Information retrieval system 700 is generally similar to information retrieval system 300 shown in FIG. 3, with the addition of source attribution generator 502. In the example of FIG. 7, source attribution generator 502 is shown implemented in research session manager 316. Source attribution generator 502 and research session manager 316 may be implemented in one or more servers, including one or more servers that implement search engine 306. In further embodiments, source attribution generator 502 may be located in alternative locations, as would be known by persons skilled in the relevant art(s). For example, in an embodiment, source attribution generator 502 and/or research session manager 316 may be coupled to network 306 directly, rather than through search engine 306, as shown in FIG. 7.

Figure 8:
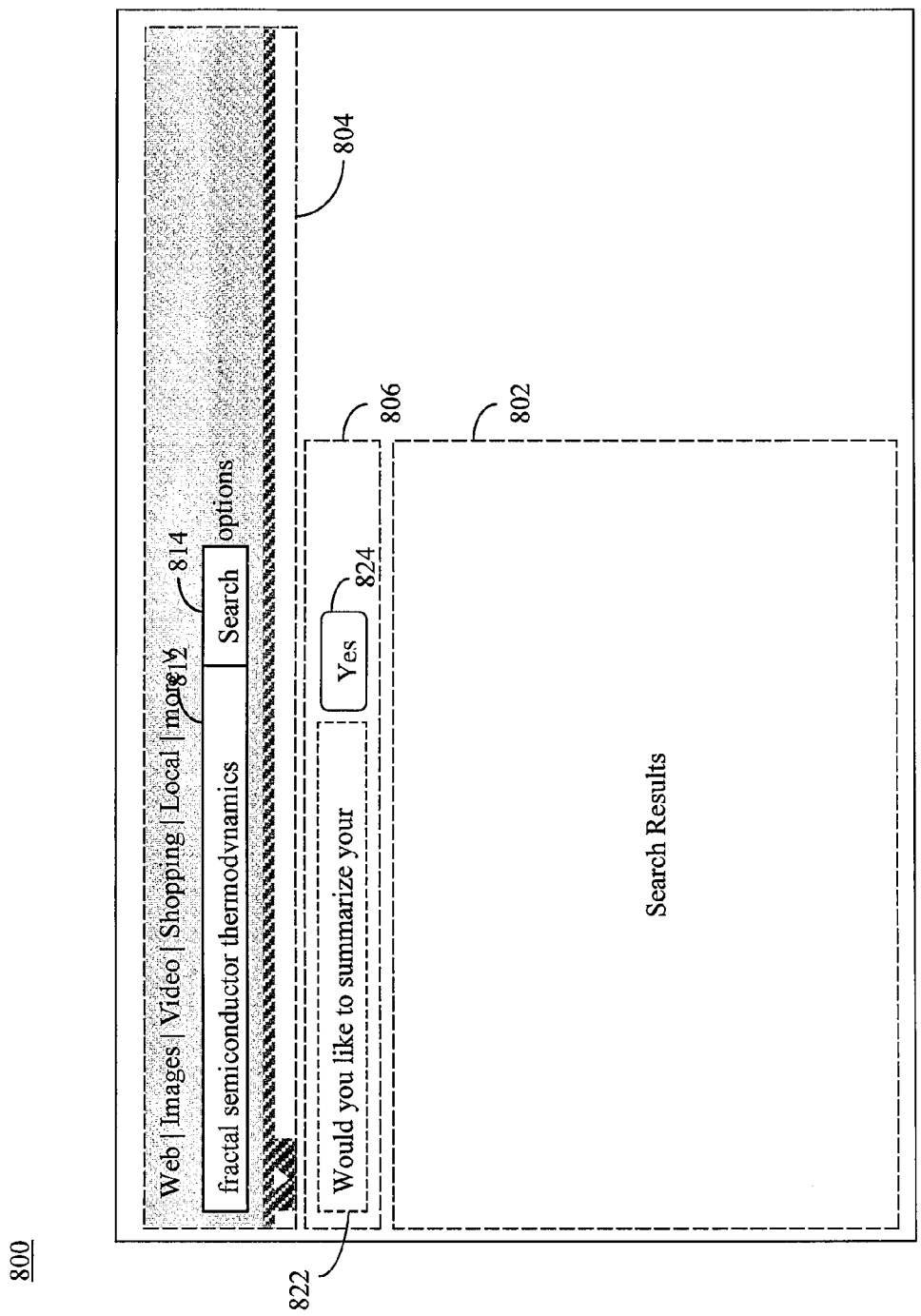
FIG. 8 is an illustration of a search results page in accordance with an embodiment of the present invention.

In an embodiment, electronic document 106 may be a research document generated through the use of research session manager 316 shown in FIG. 7. For instance, FIG. 8 depicts a search results page 800 that includes a means for accessing a research document in accordance with an embodiment of the present invention. Search results page 800 may be presented to a user by search engine 106. For example, referring FIG. 7, search results page 800 may be transmitted to computer 304a through network 305 by search engine 306 in response to query 312. As shown in FIG. 8, search results page 800 includes a search results section 802, a header section 804, and a research document access section 806. Search results section 802, header section 804, and research document access section 806 are described as follows. Further description of search results section 802, header section 804, and research document access section 806, and further examples of search results pages are provided in the Research Session Builder application referenced above.

Search results section 802 is used to display information about documents identified by search engine 106 in response to the submission of a search query by a user. Header section 804 includes a data entry box 812 and a search button 814. Data entry box 812 defines a user-editable area into which one or more query terms may be entered. Search button 814 comprises an interface element that, when activated by a user, causes search engine 106 to execute a document search based on the query term(s) entered in data entry box 812. In search results page 800, data entry box 812 includes the query terms "fractal semiconductor thermodynamics." These query terms are shown for illustrative purposes to represent query terms that may be submitted to search engine 106 to identify documents described in search results section 802.

Research document access section 806 may be automatically included within search results page 800 responsive to detection of a research session by research session manager 316. Research document access section 806 comprises an invitation portion 822 and a research document activation button 824. Invitation portion 822 includes text that asks the user whether or not the user would like to summarize his/her research. Research document activation button 824 comprises an interface element that, when activated by a user, causes a research document to be displayed to the user. The research document may be displayed, for example, in a new window that is overlaid over a window in which search results page 800 is displayed. As noted above, the research document is an example of electronic document 106, and pertains to subject matter about which the user has been conducting research.

Figure 9:
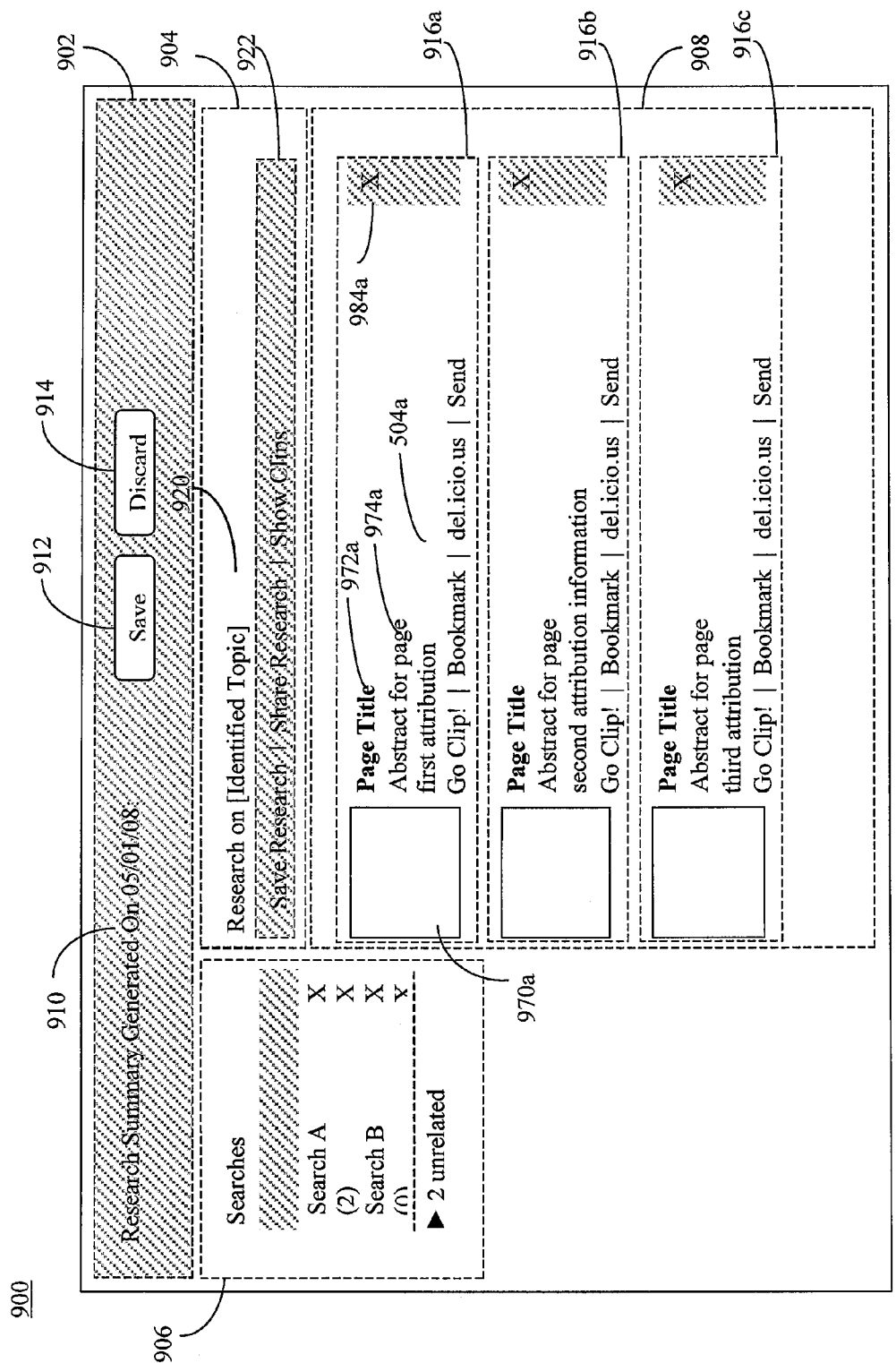
FIG. 9 depicts a research document in accordance with an embodiment of the present invention.

FIG. 9 depicts a research document 900 that is an example of electronic document 106, according to an embodiment of the present invention. Research document 900 may be displayed in a window shown in a display of computer 304a (FIG. 7), for example. In one embodiment, research document 900 may be displayed in a dedicated window that is overlaid upon a window in which a search results page is displayed. Research document 900 may be displayed in response to a user of computer 304a activating activation button 824 shown in FIG. 8, for example. As shown in FIG. 9, research document 900 includes a first header section 902, a second header section 904, a search information section 906 and a document information section 908. Each of first header section 902, second header section 904, search information section 906 and document information section 908 is described below. Further description of first header section 902, second header section 904, search information section 906 and document information section 908, and further example research documents are provided in the Research Session Builder application referenced above.

First header section 902 includes a text portion 910, a save button 912 and a discard button 914. Text portion 910 identifies a date upon which research document 900 was generated. Save button 912 is a user interface element that, when activated by a user, causes research session manager 116 to save information used to generate research document 900 so that it may be recreated at a later time. Discard button 914 is a user interface element that, when activated by a user, causes research session manager 116 to discard certain information used to generate research document 900.

Second header section 904 includes a text section 920 and a research document operations section 922. Text section 920 includes a textual description of the research topic about which research document 900 has been generated. Research session manager 116 may be configured to identify the research topic by analyzing queries submitted by the user of search engine 106 and/or information associated with documents identified by search engine 106 responsive to such queries. In one embodiment, the portion of text section 920 that describes the research topic may be edited by the user. Research document operations section 922 includes a plurality of user interface elements, each of which, when activated by the user, causes a function to be performed with respect to the content of research document 900.

Search information section 906 provides information about searches or queries previously submitted by the user.

Document information section 908 provides information about documents identified by search engine 106 responsive to the queries shown in search information section 906 and accessed by the user. Document information section 908 of document information section 908 provides document content sections 916 regarding any number of documents that have been deemed more than briefly visited or accessed by the user, and that may therefore be relevant to research document 900.

In the example of FIG. 9, first-third document content sections 916a-916c associated with three documents accessed by the user are present in document information section 908. For each document content section 916, various items of information may be provided. In the example of FIG. 9, each document content section 916 includes a graphic element 970, a document title 972 and a document abstract 974. With reference to document content section 916a, graphic element 970a comprises an image of the associated accessed document itself. For example, in an implementation in which the accessed document is a Web page, graphic element 970a may comprise a thumbnail image of the Web page or a portion thereof. Document title 972a comprises a title associated with the document. For example, in an implementation in which the document is a Web page, document title 972a may comprise the title of the Web page. Document abstract 974a comprises a textual summary of the document. For example, in an implementation in which the document is a Web page, document abstract 974a may comprise an abstract or summary associated with the Web page. Such an abstract or summary may be generated or stored by search engine 106.

Document title 972 and document abstract 974 included in a document content section 916 corresponding to an accessed document are examples of a section of content 108 inserted into research document 900 by research session manager 316.

C. Example Methods for Generating Source Attribution Information

Figure 10:
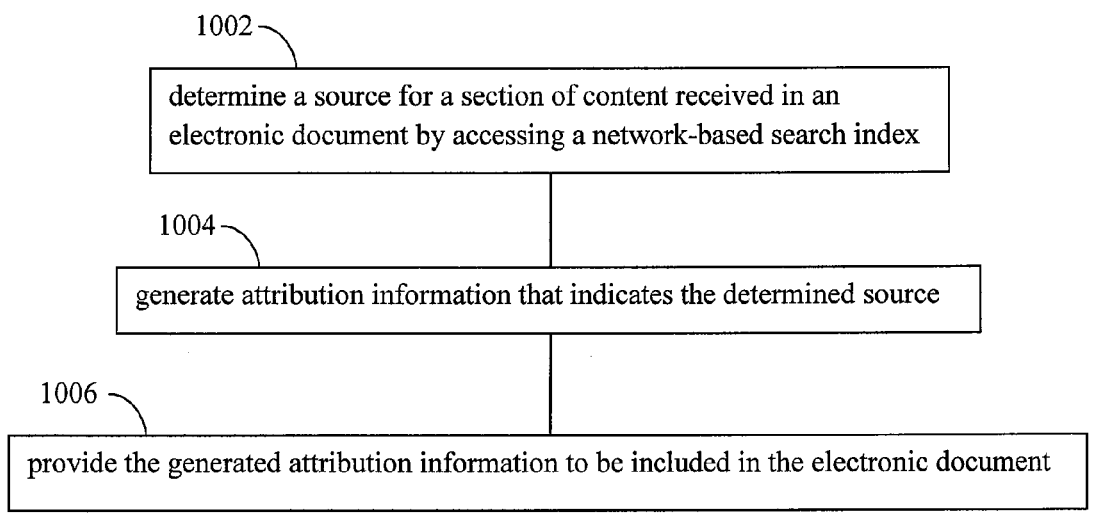
FIG. 10 shows a flowchart for generating attribution information, according to an example embodiment of the present invention.
Figure 11:
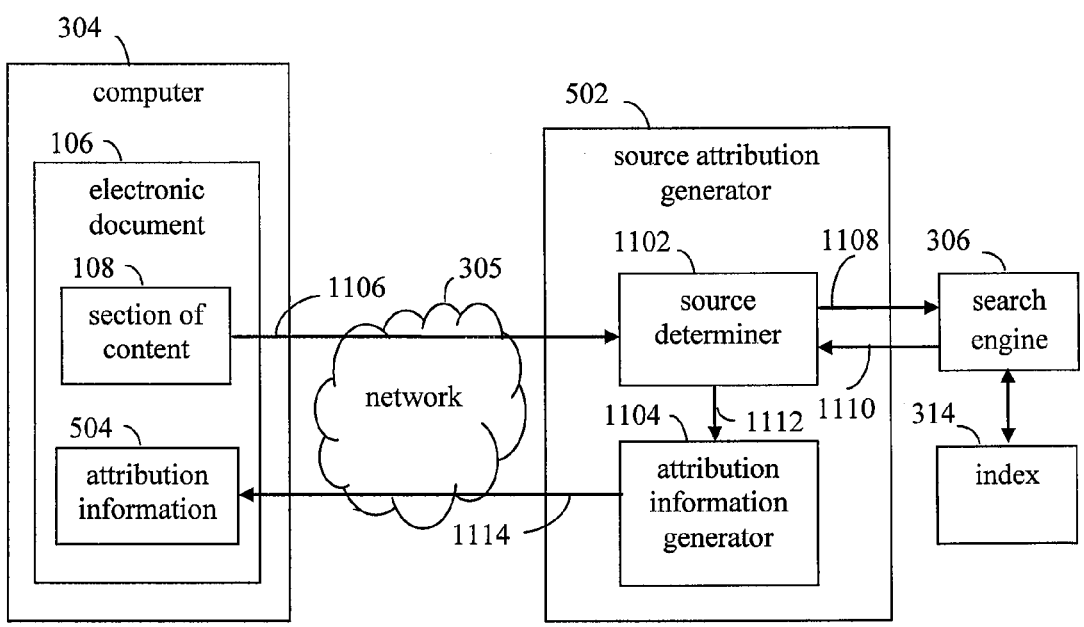
FIG. 11 shows a block diagram of an attribution generation system, according to an example embodiment of the present invention.

Attribution information 504 may be generated for inclusion in electronic document 106 in various ways, according to embodiments of the present invention. For instance, FIG. 10 shows a flowchart 1000 for generating attribution information, according to an example embodiment of the present invention. Flowchart 1000 may be performed by source attribution generator 502, for example. For illustrative purposes, flowchart 1000 is described with respect to an attribution generation system 1100 shown in FIG. 11, according to an example embodiment of the present invention. As shown in FIG. 11, system 1100 includes computer 304, network 305, search engine 306, index 314, and source attribution generator 502. Further structural and operational embodiments will be apparent to persons skilled in the relevant art(s) based on the discussion regarding flowchart 1000. For example, in the embodiment of FIG. 11, source attribution generator 504 communicates with computer 304 over network 305 to generate attribution information 504 for electronic document 106. In another embodiment, such as shown in FIG. 6, electronic document 106 and source attribution generator 502 may be local to each other (e.g., contained in the same computer). Operation of a local implementation of electronic document 106 and source attribution generator 502 will be apparent to persons skilled in the relevant art(s) based on the teachings provided herein (such as the description of flowchart 1000 provided below), and thus is not described in detail for purposes of brevity. Flowchart 1000 is described as follows.

In FIG. 10, flowchart 1000 begins with step 1002. In step 1002, a source for a section of content received in an electronic document is determined by accessing a network-based search index. In the example of FIG. 11, source attribution generator 502 may determine a source for section of content 108 received in electronic document 106. Performance of the determination may be initiated in any manner, including by the receipt of section of content 108 in electronic document 106 (e.g., due to a paste operation, due to automated insertion of content, etc.), or by a user activating a displayed graphical interface element (e.g., that is present in research document 900 shown in FIG. 9).

In an embodiment, source attribution generator 502 is configured to determine a source for section of content 108 by interacting with index 314. As shown in FIG. 11, source attribution generator 502 may include a source determiner 1102 and an attribution information generator 1104. Source determiner 1102 is configured to access search engine 306 to locate section of content 108 in index 314 to determine one or more sources for section of content 108. As shown in the example of FIG. 11, computer 304 transmits section of content 108 through network 305 in a first communication signal 1106. Source determiner 1102 receives section of content 108 in first communication signal 1106 from computer 304. In response, source determiner 1102 transmits an index search request 1108 to search engine 306, requesting that search engine 306 search index 314 for section of content 108. Search engine 306 searches index 314 for section of content 108 to determine a source that includes section of content 108 that is indexed by index 314. Search engine 306 determines source information, and transmits an index search response 1110 to source determiner 1102, which includes the determined source information. The determined source information may include one or more sources indexed by index 314 that include section of content 108, such as web pages, journal articles, etc. As shown in FIG. 11, source determiner 1102 outputs determined source 1112 that includes the source(s) returned by search engine 306. Determined source 1112 is received by attribution information generator 1104.

In an embodiment, source determiner 1102 may transmit the entirety of section of content 108 to search engine 306 in request 1108, so that search engine 306 may search index 314 for sources that includes the entirety of section of content 108. If the entirety of section of content 108 is found in index 314 with respect to an indexed document, the indexed document may be deemed to be a source of section of content 108. In another embodiment, source determiner 1102 may transmit a portion of section of content 108 to search engine 306 in request 1108, so that search engine 306 may search index 314 for sources that include the transmitted portion. For instance, one or a few words, or one or a few sentences of section of content 108 may be provided to search engine 306 to use to search index 314. If the one or a few words/sentences are found in index 314 with respect to an indexed document, the indexed document may be deemed to be a source of section of content 108. A search using one or a few words/sentences may be more efficiently performed by search engine 306, rather than using one or more entire paragraphs of text, for instance. The one or a few words/sentences may be selected from anywhere in section of content 108, including a beginning, middle, or end of section of content 108.

In an embodiment, searching of index 314 may be performed iteratively. For example, multiple searches that each use a different set of one or a few words/sentences of section of content 108 may be performed on index 314. For instance, source determiner 1102 may transmit a first set of search terms in a first request 1108a to search engine 306, a second set of search terms in a second request 1108b to search engine 306, a third set of search terms in a third request 1108c to search engine 306, etc. A first search of index 314 using the first set of search terms may be performed by search engine 306, resulting in the identification of a first set of documents, which is transmitted to source determiner 1102 in a first response 1110a. A second search of index 314 using the second set of search terms may be performed by search engine 306, and may result in identification of a second set of documents that is a subset of the first set, which is transmitted to source determiner 1102 in a second response 1110. A third search may result in identification of a third set of documents that is a subset of the second set. Such an iterative search may be repeated as many times as desired, until source determiner 1102 determines that a single source or an acceptable number of source documents are identified.

In an embodiment, source determiner 1102 may be configured such that an exact match of the entirety of section of content 108 with one or more documents indexed by search index 314 must be found in order to determine that a source is found. In another embodiment, source determiner 1102 may be configured such that documents identified in index 314 that substantially include section of content 108 (and/or that substantially include a set of search terms from section of content 108) may be considered to be determined sources. For example, source determiner 1102 may be configured such that documents identified in index 314 that include at least a predetermined percentage of section of content 108 may be considered to be determined sources, such as those that include 99%, 95%, 90%, 85%, or other suitable percentage value for the particular application.

Figure 12:
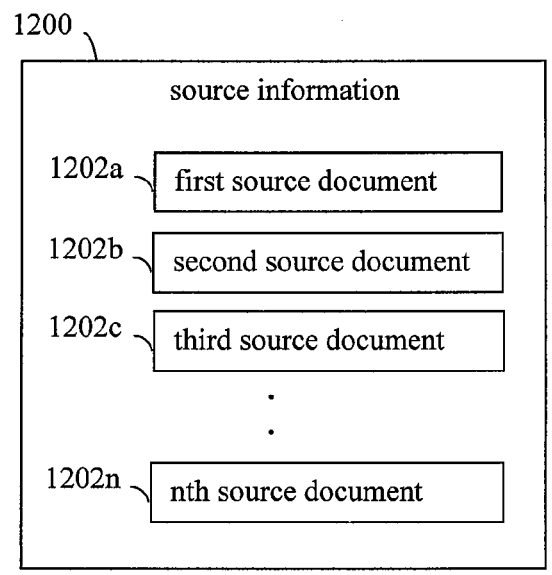
FIG. 12 shows a block diagram of determined source information, according to an example embodiment of the present invention.

Source information received by source determiner 1102 from search engine 106 may include a single source identified in index 314, or may include multiple sources identified in index 314. For instance, FIG. 12 shows a block diagram of source information 1200 determined by source determiner 1102, according to an example embodiment of the present invention. As shown in FIG. 12, determined source information 1200 includes a plurality of source documents 1202a-1202n. Source documents 1202a-1202n may be provided to attribution information generator 1104 in determined source 1112. Alternatively, in an embodiment, source determiner 1102 may be configured to select one of source documents 1202a-1202n to be a designated source for section of content 108, which may be provided to attribution information generator 1104 in determined source 1112.

Figure 13:
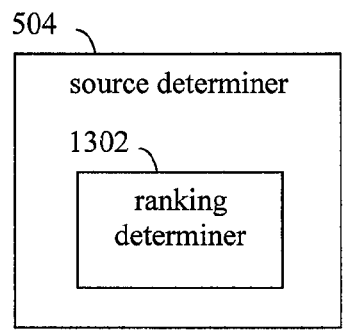
FIG. 13 shows a block diagram of a source determiner that includes a ranking determiner, according to an example embodiment of the present invention.

For example, as shown in FIG. 13, in an embodiment, source determiner 504 may include a ranking determiner 1302. Ranking determiner 1302 may be configured to select one of source documents 1202a-1202n to be a designated source for section of content 108 based on a ranking of source documents 1202a-1202n. For example, index 314 may include ranking information for indexed documents, including source documents 1202a-1202n. In an embodiment, search engine 106 may extract from index 314 the ranking information for each of source documents 1202a-1202n.

Search engine 106 may transmit the ranking information with source documents 1202a-1202n to source determiner 504 in response 1110.

Figure 14:
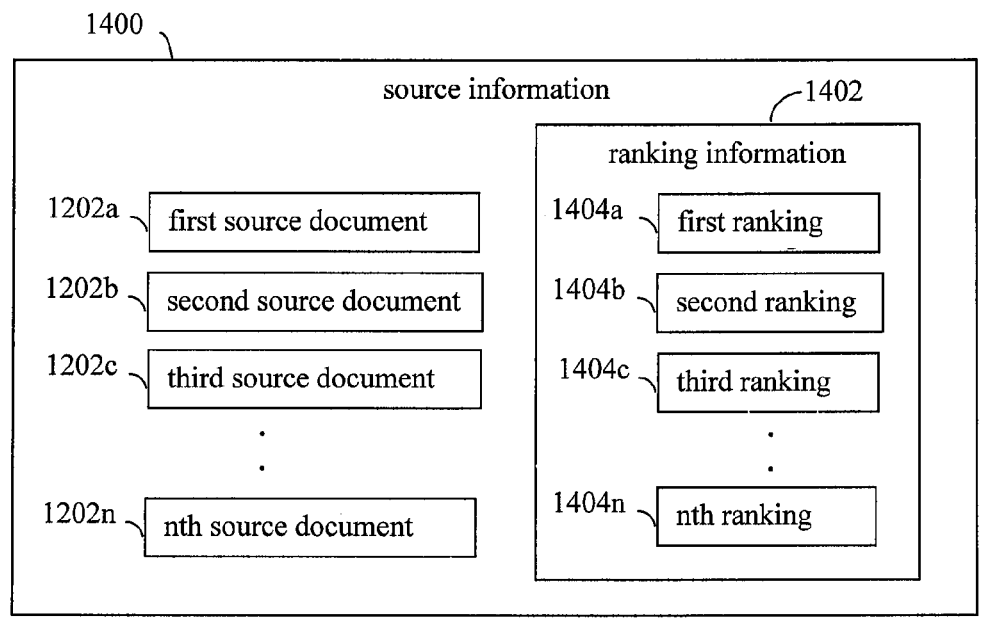
FIG. 14 shows a block diagram of determined source information, according to an example embodiment of the present invention.

FIG. 14 shows a block diagram of source information 1400, according to an example embodiment of the present invention. As shown in FIG. 14, source information 1400 is similar to source information 1200 shown in FIG. 12, with the addition of ranking information 1402. Ranking information 1402 includes a plurality of rankings 1404a-1404n received from search engine 106, with each ranking 1404 corresponding to one of determined source documents 1202a-1202n. Ranking determiner 1302 may be configured to determine a ranking of documents 1202a-1202n based on rankings 1404a-1404n. Each ranking 1404 may include ranking information for a corresponding source document 1202 with regard to any number of one or more ranking criteria. For example, each ranking 1404 may include a reputation ranking of the corresponding source document 1202, a ranking of a number of times the corresponding source document 1202 has been clicked on as a result of a search, a reliability ranking, a date of publication of the corresponding source document 1202, and/or any further ranking criteria (e.g., any ranking criteria used by Google PageRank™, etc.). Ranking determiner 1302 may be configured to select a highest ranked document 1202 (e.g., most reputable, earliest date of publication, most reliable, most clicked, etc.) of plurality of documents 1202a-1202n from the determined ranking to be the source. The source document 1202 selected from documents 1202a-1202n may be provided to attribution information generator 1104 in determined source 1112.

Referring back to flowchart 1000 (FIG. 10), in step 1004, attribution information is generated that indicates the determined source. As shown in FIG. 11, attribution information generator 1104 receives determined source 1112, which may include one or more source documents for section of content 108 determined by source determiner 1102. Attribution information generator 1104 is configured to generate attribution information that indicates one or more sources of determined source 1112, and to provide the generated attribution information to be included in electronic document 106. If a single source document 1202 is received in determined source 1112 from source determiner 1102, attribution information generator 1102 may be configured to generate a single instance of attribution information. If multiple source documents 1202 are received in determined source 1112 from source determiner 1102, attribution information generator 1102 may be configured to generate multiple corresponding instances of attribution information.

Figure 15:
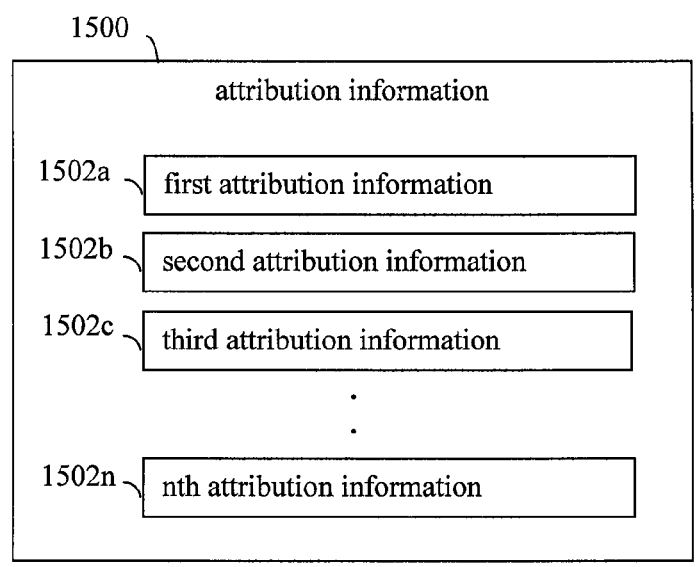
FIG. 15 shows a block diagram of attribution information determined by an attribution information generator, according to an example embodiment of the present invention.

For instance, FIG. 15 shows a block diagram of attribution information 1500 determined by attribution information generator 1104, according to an example embodiment of the present invention. Attribution information 1500 includes generated attribution information for a plurality of source documents 1202. As shown in FIG. 15, attribution information 1500 includes first-nth attribution information 1502a-1502n. Each of first-nth attribution information 1502a-1502n corresponds to one of source documents 1202a-1202n shown in FIG. 12.

In an embodiment, attribution information generator 1104 is configured to format data regarding each determined source document 1202 according to a bibliographic citation style to generate corresponding attribution information 1502.

For instance, attribution information generator 1104 may be configured to parse a determined source document 1202 for data that may be used to generate a citation entry for the source document 1202, such as authorship data, document title, publication name, publication date, web address, number of pages, publisher name, etc. Attribution information generator 1104 may parse source document 1202 for such citation data in any manner. For example, in an embodiment, attribution information generator 1104 may parse for structured data elements that correspond to the desired citation data, such as structured data elements that indicate authorship, title, publication name, etc. Alternatively, attribution information generator 1104 may be configured to recognize/determine citation data in source document 1202. For instance, attribution information generator 1104 may search near a beginning of a document for data that indicates a document title, may search for names of persons to determine author names, may search headers/footers for a publication name and/or a web address (e.g., a URL), etc.

After determining the citation data for source document 1202, attribution information generator 1104 may be configured to format the citation data according to any type of bibliographic citation style, as would be known to persons skilled in the relevant art(s). For example, citation styles provided by The Chicago Manual of Style (published by the University of Chicago Press), The Bluebook: A Uniform System of Citation (compiled by various university law reviews; primarily for citing legal documents), The AIP style (American Institute of Physics), and/or any further known citation styles may be used. In an embodiment, a commercially and/or publicly available citation generator may be used by or incorporated in attribution information generator 1104 to generate citations, such as the citation generators of www.carmun.com, headquartered in Lexington, Mass., or KnightCite at http://www.calvin.edu/library/knightcite, hosted by Calvin College Hekman Library, of Grand Rapids, Mich.

For illustrative purposes, an example citation is shown below for a web-based document:

J. T. Westermeier, Ethical Issues for Lawyers on the Internet and World Wide Web, 6 Rich. J. L. & Tech. 5, ¶7 (1999), at http://www.richmond.edu/jolt/v6il/westermeier.html.

As shown, the citation includes authorship data (J. T. Westermeier), document title data (Ethical Issues for Lawyers on the Internet and World Wide Web), publication data (6 Rich. J. L. & Tech.), page number/paragraph number data (5, ¶7), publication date data (1999), and web location information in the form of a URL (at http://www.richmond.edu/jolt/v6il/westermeier.html). The citation may be provided in attribution information 504 to be displayed in electronic document 106 in this style, or in any other suitable citation style, as would be known to persons skilled in the relevant art(s).

Referring back to flowchart 1000 (in FIG. 10), in step 1006, the generated attribution information is provided to be included in the electronic document. As shown in FIG. 11, attribution information generator 1104 transmits generated attribution information through network 305 on a second communication signal 1114. Computer 304 receives the generated attribution information in second communication signal 1114. The generated attribution information is inserted into electronic document 106 as attribution information 504. A display of computer 304 may display electronic document 106 with section of content 108 and corresponding attribution information 504 also displayed.

Note that in an embodiment, although source attribution generator 502 may provide attribution information for a plurality of determined source documents, a user of electronic document 106 may desire to include fewer than all of the determined source documents in electronic document 106, including a single source document. In an embodiment, an interface at computer 304 (e.g., a web browser window) may be configured to display a list of source documents 1202 determined by source determiner 1102 (e.g., received from source determiner 1102 in a communication signal, not shown in FIG. 11), such as documents 1202*a*-1202*n* shown in FIG. 12. The interface may enable the user to select one or more of documents 1202*a*-1202*n*, including a single document 1202, to be included in electronic document 106 as a source for section of content 108.

In another embodiment, attribution information generator 1104 may generate attribution information for each determined source document 1202, such as generating attribution information 1502*a*-1502*n* shown in FIG. 15. Attribution information 1502*a*-1502*n* may be transmitted to computer 304 in signal 1114. An interface at computer 304 (e.g., a web browser window) may be configured to display a list of the received attribution information 1502 determined by attribution information generator 1104, such as attribution information 1502*a*-1502*n*. The interface may enable the user to select one or more of attribution information 1502*a*-1502*n*, including a single attribution information 1502, to be included in electronic document 106 as attribution information 504 for section of content 108.

Figure 16:
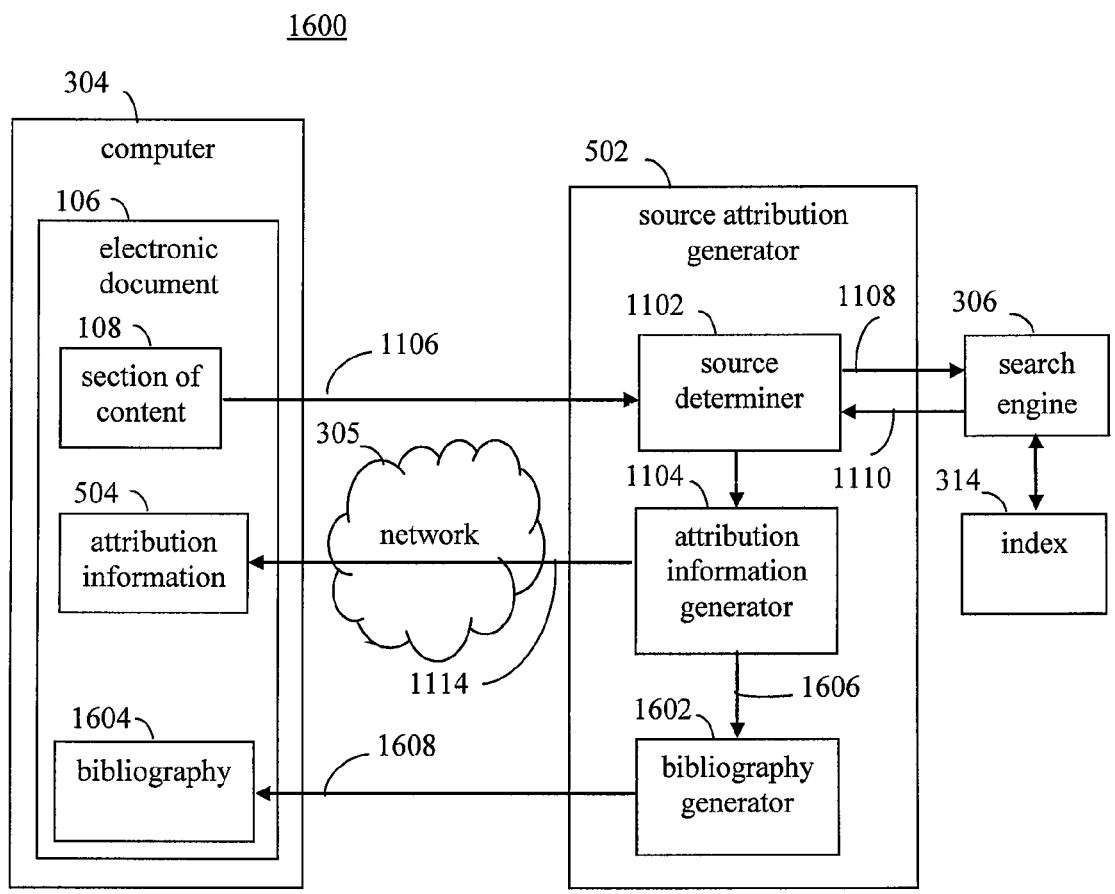
FIG. 16 shows a block diagram of an attribution generation system that enables generation of a bibliography section for a document, according to an example embodiment of the present invention.

In an embodiment, a user may desire to generate a full bibliography section for electronic document 106, which may include multiple different sections of content 108. Such a full bibliography section may be generated in various ways. For example, FIG. 16 shows a block diagram of an attribution generation system 1600 that enables generation of a bibliography section, according to an example embodiment of the present invention. As shown in FIG. 16, system 1600 is similar to system 1100 shown in FIG. 11, with the addition of bibliography generator 1602 in source attribution generator 502. Bibliography generator 1602 configured to generate a bibliography 1604 that includes attribution information 504 for a plurality of sections of content 108 for inclusion in electronic document 106.

For example, as shown in FIG. 16, bibliography generator 1602 receives an attribution information signal 1606 from attribution information generator 1104, which includes attribution information 1502 generated for a particular source document 1202. Each time attribution information 1502 is generated for a source document 1202, bibliography generator 1602 receives the generated attribution information 1502 in attribution information signal 1606. Bibliography generator 1602 collects and stores each received instance of attribution information 1502. An interface at computer 304 may enable a user to request that a bibliography be generated for electronic document 106, such as by providing a user interface element (e.g., a graphical button) in the interface (e.g., displayed in research document 900 of FIG. 9). When the user interacts with the user interface element, bibliography generator 1602 transmits a third communication signal 1608 through network 306 to computer 304, which includes the collected attribution information. The interface displaying electronic document 106 may be configured to display bibliography 1604 in electronic document 106, including display of the collected attribution information stored by bibliography generator 1602 for each source document of any sections of content 108 displayed in electronic document 106.

D. Example Embodiments for Updating Research Documents

A user may copy content from an external source, such as a document of the World Wide Web, into an electronic document, such as a research document. For example, referring to FIG. 1, a user may copy section of content 108 from source 110, which may be a web page of World Wide Web 302 (FIG. 3), into electronic document 106. After performing the copy, source 110 may be updated. For example, price and/or other information present in source 110 may be updated due to market changes, etc. As a result, section of content 108 copied by the user into electronic document 106 may be out of date (relative to source 110). In some cases, the user may desire that content copied into electronic document 106 be maintained up-to-date. However, to do so, the user must manually repeatedly visit all external sources that have provided content to document 106 to determine whether they have been updated, and if so, to copy the updates into electronic document 106. This may be an effort that is so time consuming, that it is not reasonably feasible.

Embodiments of the present invention enable content received in an electronic document to be updated with little to no effort from a user. Such embodiments enable content of electronic documents to be kept up-to-date with significantly less effort than conventional approaches.

Figure 17:
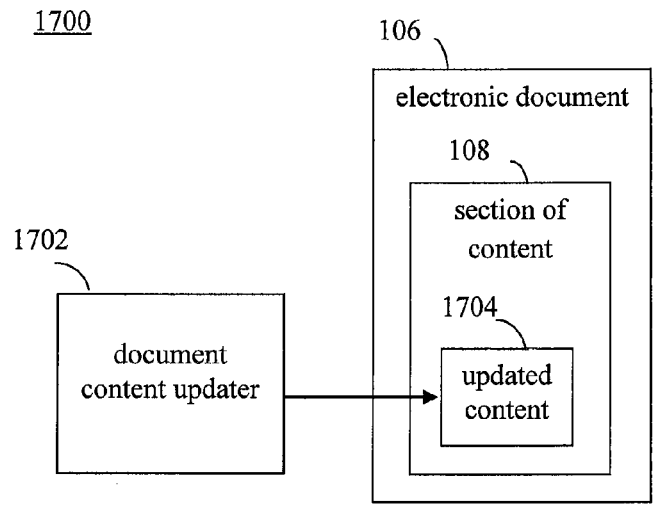
FIG. 17 shows a block diagram of a document content update system, according to an example embodiment of the present invention.

For example, FIG. 17 shows a block diagram of a document content update system 1700, according to an example embodiment of the present invention. As shown in FIG. 17, system 1700 includes a document content updater 1702. In FIG. 17, the source of section of content 108 (e.g., source 110 shown in FIG. 1) may have been updated, and thus section of content 108 in electronic document 108 may contain information that is out of date. Document content updater 1702 is configured to generate an updated content 1704 for section of content 108. Updated content 1704 may include updated content for a portion or entirety of section of content 108. For instance, updated content 1704 may include additional content, modified content, and/or may indicate deleted content for source 110 relative to section of content 108.

Updated content 1704 is output from document content updater 1702, and is used to modify section of content 108 displayed by document 106.

Generation of updated content 1704 by document content updater 1702 may be initiated in various ways. For example, document content updater 1702 may be configured to periodically (e.g., daily, weekly, monthly, etc.) determine whether updates have occurred to source 110. When document content updater 1702 determines that an update has occurred to source 110, document content updater 1702 may generate updated content 1704 for section of content 108. Alternatively, a graphical interface element may be present on a graphical interface displayed to the user that if interacted with by the user, causes document content updater 1702 to determine whether an update has occurred, and if so, to generate updated content 1704 for section of content 108.

Figure 18:
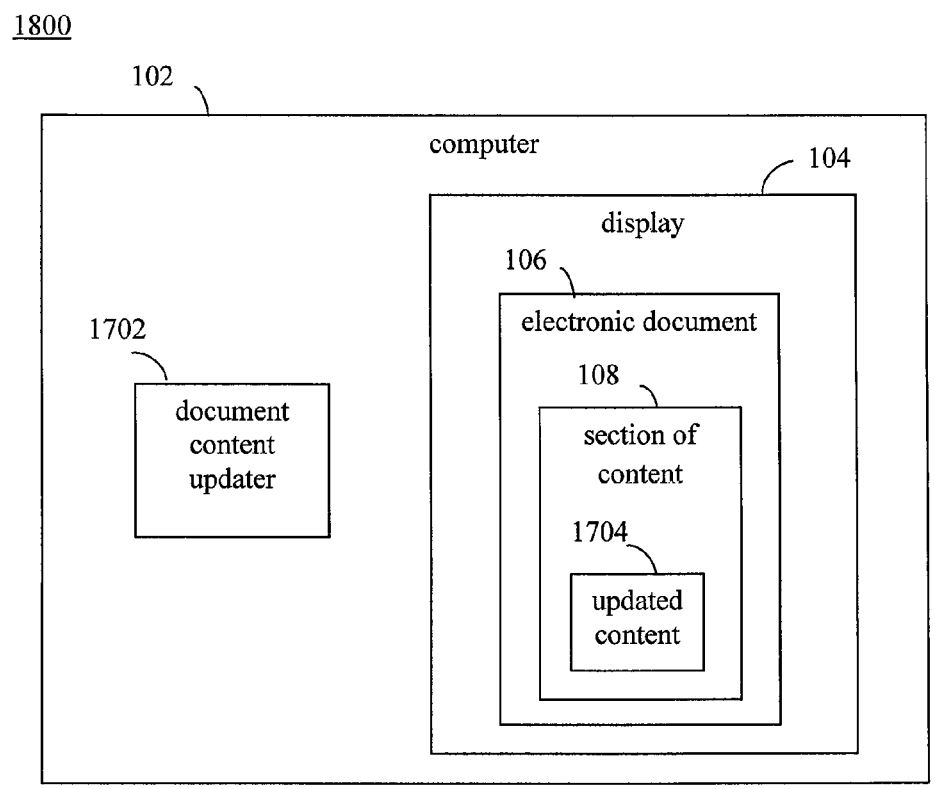
FIG. 18 shows a block diagram of a computer system in which a document content updater may be located, according to an example embodiment of the present invention.

Document content updater 1702 may be implemented in hardware, software, firmware, or any combination thereof. For example, document content updater 1702 may be implemented in hardware logic, and/or may include software/firmware that executes in one or more processors of one or more computer systems, such as one or more servers. Document content updater 1702 may be located in any suitable location. For instance, FIG. 18 shows a block diagram of a computer system 1800 in which document content updater 1702 may be located, according to an example embodiment of the present invention. As shown in FIG. 18, computer system 1800 includes computer 102. Computer 102 includes document content updater 1702, which may be implemented as software code that runs on computer 102, for example. Computer 102 further includes display 104, which displays electronic document 106. As shown in FIG. 6, electronic document 106 displays section of content 108 and updated content 1704 generated by document content updater 1702, which provides one or more updates to section of content 108.

Figure 19:
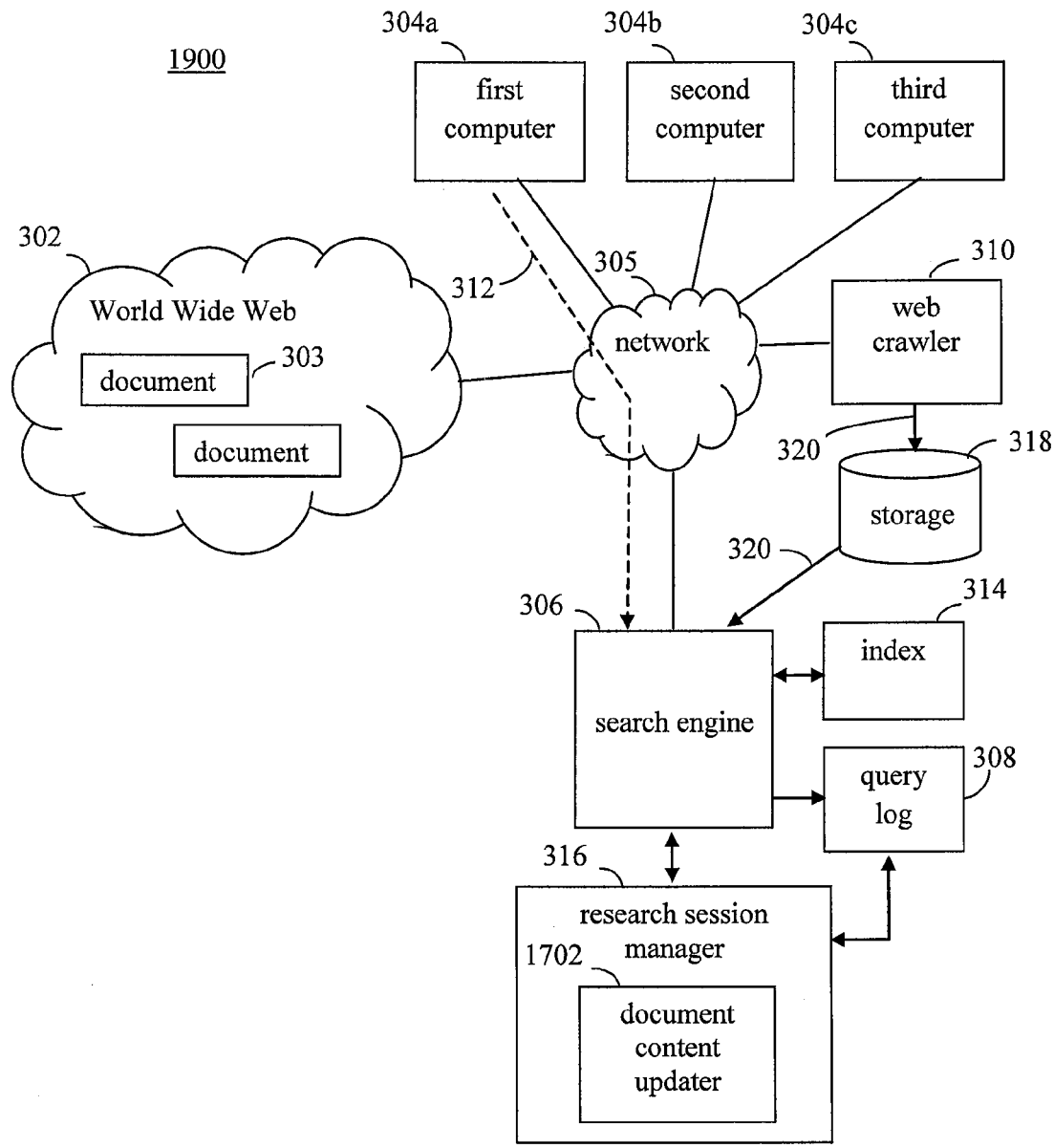
FIG. 19 shows a block diagram of an information retrieval system that may include a document content updater, according to an example embodiment of the present invention.

FIG. 19 shows a block diagram of an information retrieval system 1900 that may include document content updater 1702, according to an example embodiment of the present invention. Information retrieval system 1900 is generally similar to information retrieval system 300 shown in FIG. 3, with the addition of document content updater 1702. In the example of FIG. 19, document content updater 1702 is shown implemented in research session manager 316. Document content updater 1702 and research session manager 316 may be implemented in one or more servers, including one or more servers that implement search engine 306. In further embodiments, document content updater 1702 may be located in an alternative location, as would be known by persons skilled in the relevant art(s). For example, in an embodiment, document content updater 1702 and/or research session manager 316 may be coupled to network 306 directly, rather than through search engine 306, as shown in FIG. 19.

Figure 21:
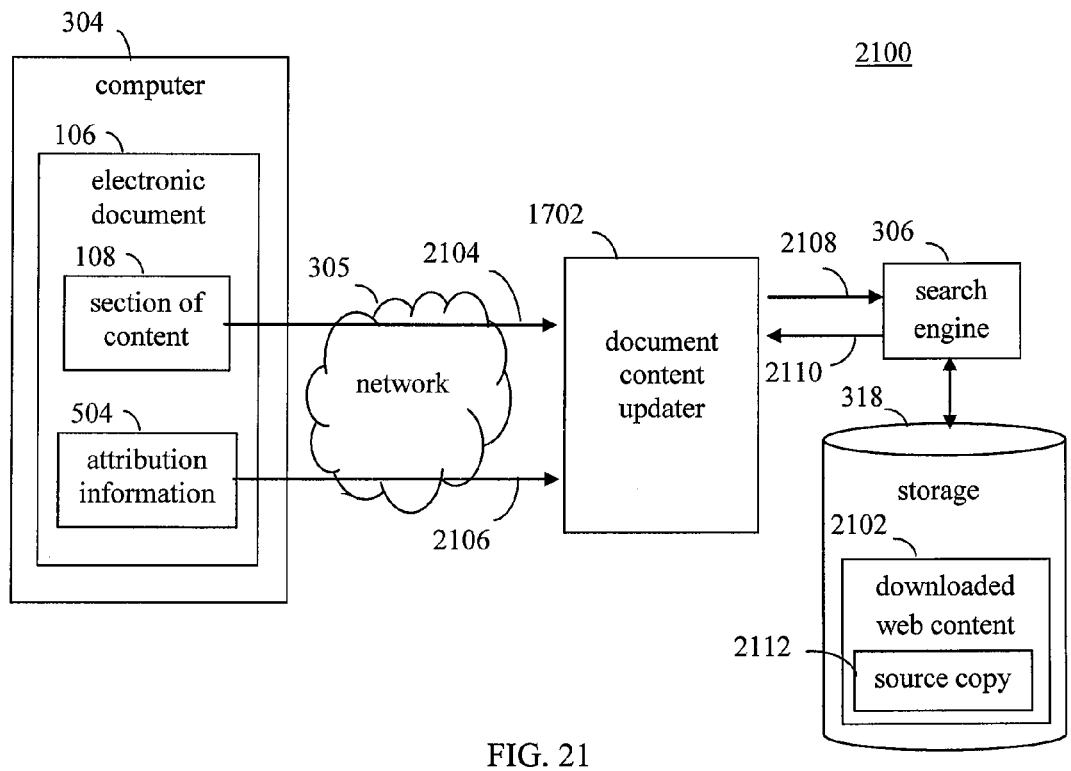
FIGS. 21 and 22 show block diagrams of a document content update system, according to an example embodiment of the present invention.

Updated content 1704 may be generated for inclusion in electronic document 106 in various ways, according to embodiments of the present invention. For instance, FIG. 20 shows a flowchart 2000 for generating updated content, according to an example embodiment of the present invention. Flowchart 2000 may be performed by document content updater 1702, for example. For illustrative purposes, flowchart 2000 is described with respect to an attribution generation system 2100 shown in FIGS. 21 and 22, according to an example embodiment of the present invention. As shown in FIG. 21, system 2100 includes computer 304, network 305, search engine 306, storage 318, and document content updater 1702. Further structural and operational embodiments will be apparent to persons skilled in the relevant art(s) based on the discussion regarding flowchart 2000. For example, in the embodiment of FIG. 21, document content updater 1702 generates updated content 1704 to be provided to electronic document 106 over network 305. In another embodiment, such as shown in FIG. 18, electronic document 106 and document content updater 1702 may be local to each other (e.g., in the same computer). Operation of such an embodiment is not described in detail for purposes of brevity, and will be apparent to persons skilled in the relevant art(s) from the teachings herein. Flowchart 2000 is described as follows.

In FIG. 20, flowchart 2000 begins with step 2002. In step 2002, a web-based source is determined for a section of content that is contained in an electronic document. In an embodiment, document content updater 1702 is configured to perform step 2002. As shown in FIG. 21, computer 304 transmits section of content 108 through network 305 on a first communication signal 2104. Document content updater 1702 receives section of content 108 in first communication signal 2104 from computer 304. According to step 2002, document content updater 1702 determines an identity of a web-based source from which section of content 108 was copied into electronic document 106. Document content updater 1702 may perform this determination in various ways.

For example, in an embodiment, as shown in FIG. 21, computer 304 may transmit attribution information 504 to document content updater 1702 through network 305 on a second communication signal 2106. Document content updater 1702 may determine the identity of the web-based source of section of content 108 from attribution information 504. For instance, identity of a source may be determined from the following example of attribution information 504 (from an example provided above):

J. T. Westermeier, Ethical Issues for Lawyers on the Internet and World Wide Web, 6 Rich. J. L. & Tech. 5, ¶7 (1999), at http://www.richmond.edu/jolt/v6il/westermeier.html.

In this example, the source may be determined according to the provided URL—http://www.richmond.edu/jolt/v6il/westermeier.html.

In step 2004 of flowchart 2000 (FIG. 20), an update is determined for the section of content that is included in a copy of the web-based source contained in web-content downloaded by a web crawler. In an embodiment, document content updater 1702 is configured to perform step 2004. For example, as shown in FIG. 21, document content updater 1702 may interact with downloaded web content 2102 previously downloaded by web crawler 310 (FIG. 19) and stored in storage 318 to determine whether an update has been made to the determined source, and if so, to obtain a copy of the updated determined source. As shown in FIG. 21, downloaded web content 2102 includes a source copy 2112, which is a copy of the source determined in step 2002 for section of content 108. Source copy 2112 was previously downloaded by web crawler 310. Source copy 2112 may be a web page, journal article, or other form of web content. Source copy 2112 may be located in downloaded web content according to source identification information (e.g., URL) determined in step 2002.

In an embodiment, document content updater 1702 may be configured to determine whether source copy 2112 contained in downloaded web content 2102 is more up-to-date relative to section of content 108 contained in the electronic document 106. This may be performed in a variety of ways. For example, in an embodiment, document content updater 1702 may determine a time at which source copy 2112 was downloaded by web crawler 310. Such time information is typically provided in storage 318 by web crawler 310 with downloaded web content 2102. Document content updater 1702 may also determine a time at which electronic document 106 was last edited. Such last time of edit information may be provided in/with electronic document 106. If the determined crawl time for source copy 2112 is more recent than the last edit time for electronic document 106, source copy 2112 is more up-to-date relative to section of content 108 contained in electronic document 106. In such a case, source copy 2112 may include one or more updates relative to section of content 108.

As shown in FIG. 21, document content updater 1702 may transmit a source copy request 2108 to search engine 306, requesting that search engine 306 provide source copy 2112. Search engine 306 receives request 2108, and searches downloaded web content 2102 for source copy 2112, such as by URL or other identifying attribute that may be determined in step 2002. Search engine 306 obtains source copy 2112 from storage 318, and transmits a response 2110 to document content updater 1702, which includes source copy 2112.

Document content updater 1702 may be configured to compare source copy 2112 received in response 2110 to section of content 108 received in communication signal 2104 from computer 304 to determine any differences. If differences are determined between source copy 2112 and section of content 108 (e.g., with respect to the portion of source copy 2112 that relates to section of content 108), the portion(s) of source copy 2112 that are different from section of content 108 can be extracted from source copy 2112, to be provided as updated content 1704 to section of content 108 in electronic document 106.

Figure 22:
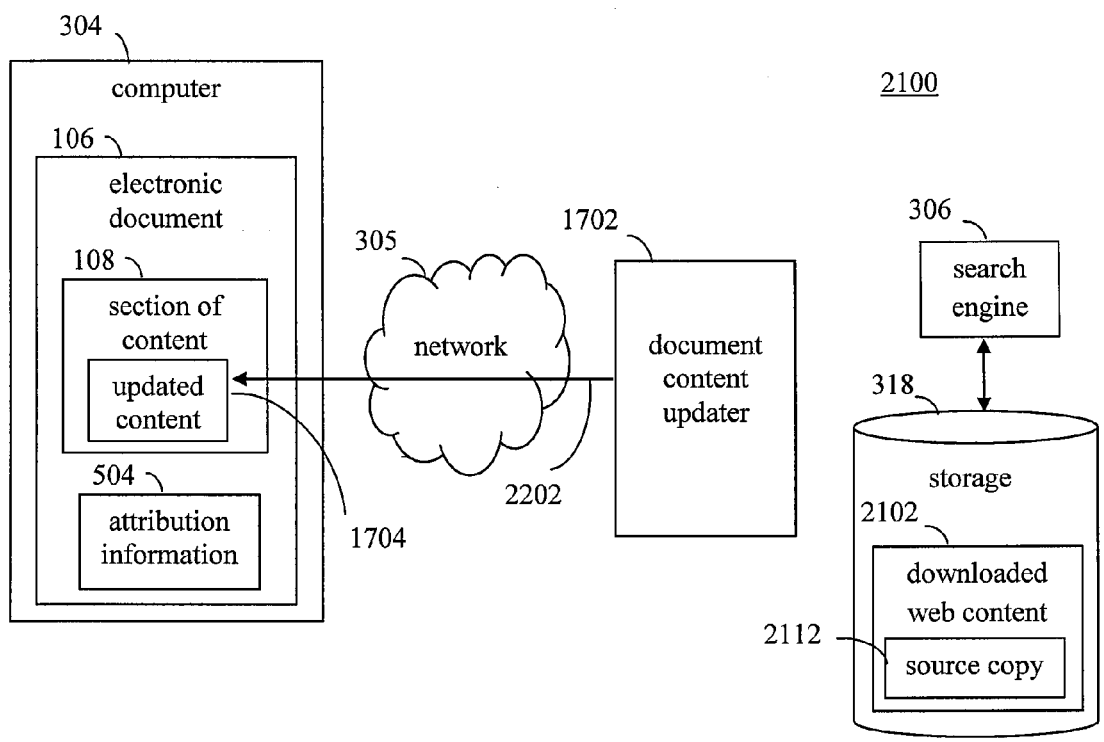

Referring back to flowchart 2000 in FIG. 20, in step 2006, the determined update is provided to be indicated in the electronic document. In an embodiment, document content updater 1702 may be configured to modify section of content 108 with updated content 1704, and to transmit the updated version of section of content 108 to computer 304 through network 305 in a third communication signal 2202 (as shown in FIG. 22). The updated version of section of content 108 can then be incorporated into electronic document 106. In another embodiment, document content updater 1702 may be configured to transmit updated content 1704 to computer 304 in communication signal 2202, and section of content 108 may be modified with updated content 1704 at computer 304.

In still another embodiment, document content updater 1702 may be configured to transmit updated content 1704 to computer 304 in communication signal 2202, and updated content 1704 may be highlighted in section of content 108 (rather than actually being modified into section of content 108). For example, updated content 1704 may be shown in section of content 108 of electronic document 106 in the form of redlined text, where added text (and/or other content) is bolded (or otherwise indicated) and deleted text (and/or other content) is shown with strikethrough (or otherwise indicated). Such highlighting may be performed in this manner, or in other ways, such as by showing updated content 1704 in a different color and/or pattern in section of content 108. Electronic document 106 may be configured to enable a user to selectively incorporate highlighted updated content 1704 into section of content 108 of electronic document 106 in any manner, such as by being enabled to separately accept or reject each update provided by updated content 1704 into section of content 108.

As described above, updated content 1704 may include updated text, graphics, and/or other types of content. Updated content 1704 may include additions of content, modifications of content, and deletions of content of section of content 108. Any type of data may be updated in section of content 108 according to updated content 1704, including structured and/or unstructured data. Enabling updating of content in research documents in this manner provides numerous benefits. Examples of updating of structured data include updating prices in a shopping research document that have changed, updating research on a medical condition as key discoveries are made in diagnosis and/or treatment, and updating academic or current events research so that the most recent insights a provided.

E. Example Computer System Implementations

Note that any one or more of source attribution determiner 502 shown in FIGS. 5-7, 11, and 16, source determiner 1102 shown in FIGS. 11, 13, and 16, attribution information generator 1104 shown in FIGS. 11 and 16, ranking determiner 1302 shown in FIG. 13, bibliography generator 1602 shown in FIG. 16, and document content updater 1702 shown in FIGS. 17-19, 21, and 22 may include hardware, software, firmware, or any combination thereof to perform at least a portion of their functions. For example, any one or more of source attribution determiner 502, source determiner 1102, attribution information generator 1104, ranking determiner 1302, bibliography generator 1602, and document content updater 1702 may include computer code configured to be executed in one or more processors. Alternatively or additionally, any one or more of may include hardware logic/electrical circuitry.

In an embodiment, source attribution determiner 502, source determiner 1102, attribution information generator 1104, ranking determiner 1302, bibliography generator 1602, and document content updater 1702 may implemented in one or more computers, including a personal computer, a mobile computer (e.g., a laptop computer, a notebook computer, a handheld computer such as a personal digital assistant (PDA) or a Palm™ device, etc.), or a workstation. These example devices are provided herein purposes of illustration, and are not intended to be limiting. Embodiments of the present invention may be implemented in further types of devices, as would be known to persons skilled in the relevant art(s).

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing source attribution determiner 502, source determiner 1102, attribution information generator 1104, ranking determiner 1302, bibliography generator 1602, document content updater 170, flowchart 1000 of FIG. 10, and flowchart 2000 of FIG. 20, and/or further embodiments of the present invention described herein. Embodiments of the invention are directed to computer program products comprising such logic (e.g., in the form of software) stored on any computer useable medium. Such software, when executed in one or more data processing devices, causes a device to operate as described herein.

F. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method for updating an electronic document, comprising:
   determining a web-based source from which a section of content in an electronic document was copied based, at least in part, on attribution information provided in the electronic document for the section of content;
   determining one or more updates relative to the section of content based, at least in part, on a copy of the web-based source downloaded by a web crawler configured to methodically browse a World Wide Web for documents to copy and download web content; and
   providing the determined one or more updates relative to the section of the content to be indicated in the electronic document, wherein the one or more updates relative to the section of the content occur after the section of content being copied from the web-based source to the electronic document.

2. The method of claim 1, wherein said determining one or more updates relative to the section of content comprises:
   locating the copy of the web-based source downloaded by the web crawler; and
   determining whether the located copy of the web-based source is more up-to-date relative to the section of content contained in the electronic document.

3. The method of claim 2, wherein said determining whether the located copy of the web-based source is more up-to-date relative to the section of content in the electronic document comprises:
   determining a time at which the copy of the web-based source was downloaded by the web crawler; and
   determining that the copy of the web-based source is more up-to-date relative to the section of content in the electronic document if the determined time is more recent than a time that the electronic document was last edited.

4. The method of claim 2, wherein said determining one or more updates relative to the section of content comprises:
   comparing the copy of the web-based source to the section of content in the electronic document to determine the one or more updates relative to the section of content in the electronic document.

5. The method of claim 1, further comprising:
   modifying the section of content in the electronic document according to the determined one or more updates.

6. The method of claim 5, wherein the determined one or more updates include updated price information present in the copy of the source, wherein said modifying the section of content in the electronic document according to the determined one or more updates comprises:
   updating at least one price indicated in the section of content in the electronic document according to the updated price information.

7. The method of claim 1, further comprising:
   highlighting the determined one or more updates to the section of content in the electronic document; and
   enabling a user to selectively incorporate the highlighted determined one or more updates into the section of content in the electronic document.

8. The method of claim 7, wherein highlighting the determined one or more updates to the section of content in the electronic document is made in the form of redlined text.

9. A system having at least one processor for updating a document, comprising:
   a document content updater, implemented a on the at least one processor and configured to
      determine a web-based source from which a section of content in an electronic document was copied based, at least in part, on attribution information provided in the electronic document for the section of content,
      determine one or more updates relative to the section of content based, at least in part, on a copy of the web-based source downloaded by a web crawler configured to methodically browse a World Wide Web for documents to copy and download web content, and
      provide the determined one or more updates relative to the section of the content to be indicated in the electronic document, wherein one or more updates relative to the section of the content occur after the section of content being copied from the web-based source to the electronic document.

10. The system of claim 9, wherein prior to determining the update, the document content updater is configured to
   determine a time at which the copy of the web-based source contained in the web content was downloaded by the web crawler, and
   determine that the copy of the web-based source is more up-to-date relative to the section of content in the electronic document if the determined time is more recent than a time that the electronic document was last edited.

11. The system of claim 10, wherein the document content updater is configured to compare the copy of the web-based source to the section of content in the electronic document to determine the one or more updates relative to the section of content in the electronic document.

12. The system of claim 9, wherein the document content updater is configured to provide the determined update one or more updates to a document editor that displays the electronic document.

13. The system of claim 12, wherein the document editor is configured to display the section of content in the electronic document with the determined one or more updates made to the section of content.

14. The system of claim 12, wherein the document editor is configured to
   highlight the determined one or more updates in the display of the electronic document, and
   enable a user to selectively incorporate the highlighted determined one or more updates into the section of content in the electronic document.

15. The system of claim 12, wherein the document editor is displayed by a web browser.

16. A non-transitory computer readable medium having information recorded thereon for updating an electronic document, wherein the information, when read by a computer, causes the computer to perform the following:
   determining a web-based source from which a section of content in an electronic document was copied based, at least in part, on attribution information provided in the electronic document for the section of content;
   determining one or more updates relative to the section of content based, at least in part, on a copy of the web-based source downloaded by a web crawler configured to methodically browse a World Wide Web for documents to copy and download web content; and
   providing the determined one or more updates relative to the section of the content to be indicated in the electronic document, wherein the one or more updates relative to the section of the content occur after the section of content being copied from the web-based source to the electronic document.

17. The medium of claim 16, wherein said determining one or more updates relative to the section of content comprises:
   locating the copy of the web-based source downloaded by the web crawler; and
   determining whether the located copy of the web-based source is more up-to-date relative to the section of content in the electronic document.

18. The medium of claim 17, wherein said determining whether the located copy of the web-based source is more up-to-date relative to the section of content in the electronic document comprises:
   determining a time at which the copy of the web-based source was downloaded by the web crawler; and
   determining that the copy of the web-based source is more up-to-date relative to the section of content in the electronic document if the determined time is more recent than a time that the electronic document was last edited.

19. The medium of claim 17, wherein said determining one or more updates relative to the section of content comprises:

comparing the copy of the web-based source to the section of content in the electronic document to determine the one or more updates relative to the section of content in the electronic document.

20. The medium of claim 16, further comprising:
modifying the section of content in the electronic document according to the determined one or more updates.

21. The medium of claim 20, wherein the determined one or more updates include updated price information present in the copy of the source, wherein said modifying the section of content in the electronic document according to the determined one or more updates comprises:
updating at least one price indicated in the section of content in the electronic document according to the updated price information.

22. The medium of claim 16, further comprising:
highlighting the determined one or more updates to the section of content in the electronic document; and
enabling a user to selectively incorporate the highlighted determined one or more updates into the section of content in the electronic document.

\* \* \* \* \*